United States Patent
De Clerk et al.

[15] 3,657,534
[45] Apr. 18, 1972

[54] DIGITAL SCALE FOR TOMOGRAPHY AND METHOD OF USING SAME

[72] Inventors: Joseph L. De Clerk, Red Bank; Martin Weinstock, Long Branch, both of N.J.

[73] Assignee: The United States of America as represented by the Secretary of the Army

[22] Filed: Mar. 12, 1970

[21] Appl. No.: 18,981

[52] U.S. Cl..............................250/59, 250/61.5, 250/65, 250/67
[51] Int. Cl. .......................................................G03b 41/16
[58] Field of Search ...............................250/59, 61.5, 65, 67

[56] References Cited

UNITED STATES PATENTS

| | | | |
|---|---|---|---|
| 2,975,282 | 3/1961 | Schaffer | 250/67 X |
| 3,001,070 | 9/1961 | Davis et al. | 250/67 |
| 3,111,582 | 11/1963 | Levi | 250/67 X |
| 3,509,337 | 4/1970 | De Clerk et al. | 250/59 |

OTHER PUBLICATIONS

American Journal of Roentgenology and Radium Therapy; Vol. XXXVI, No. 5; Nov. 1936; p. 580

*Primary Examiner*—Anthony L. Birch
*Attorney*—Charles K. Wright, Jr., William G. Gapcynski and Lawrence A. Neureither

[57] ABSTRACT

A test object for measuring the depth of focus of an X-ray exposure. The test object is comprised of a planar surface of X-ray transparent material on which are positioned a coded array of X-ray opaque elements. In use, the test object is angularly inclined to the X-ray field so that the number of coded elements in focus in the resulting X-ray exposure provides a measurement of the depth of focus of the X-ray device.

6 Claims, 2 Drawing Figures

INVENTORS
JOSEPH L. De CLERK &
MARTIN WEINSTOCK
BY Charles K Wright
ATTORNEY

DIGITAL SCALE FOR TOMOGRAPHY AND METHOD OF USING SAME

The invention described herein may be manufactured and used by or for the Government for governmental purposes without the payment to us of any royalty thereon.

BACKGROUND OF THE INVENTION

1. Field of the Invention

This invention is designed to improve the accuracy of simultaneous multisection tomography by measuring the region over which an X-ray exposure is in focus. Although the invention can be used to determine the height from the object plane of the region which is in focus, the test object described in co-pending application "A Test Object and Cassette for Tomograph," Ser. No. 686,889, filed Nov. 30 1967, now U.S. Pat. No. 3,509,337, issued Apr. 28, 1970, is more conveniently used for this purpose, and the invention described herein is considered to be most profitably used in conjunction with the test object previously described to determine the depth of focus of each exposure plane.

2. Description of the Prior Art

Prior measurements of the depth of focus of an X-ray image were not possible using only a single exposure. Depth of focus could be measured using the test object described in co-pending application, Ser. No. 686,889, filed 30 Nov. 1967, now U.S. Pat. No. 3,509,337, issued Apr. 28, 1970 by taking a series of exposures with the test object set to a different height on each exposure. However, such procedure is inaccurate, time consuming, laborious, and costly.

SUMMARY OF THE INVENTION

This invention overcomes the limitations of prior methods by providing a test object which measures the depth of focus of an X-ray device with only one exposure. The invention comprises a planar surface of X-ray transparent material on which is mounted a plurality of X-ray opaque elements arranged in a coded sequence. In use, the test object is angularly inclined to the axis of the X-ray beam so that only the opaque elements in the vertical region of focus will be in focus on the developed film image. Since the opaque elements are mounted on the planar surface in a coded relationship, the elements in focus can be identified and their location relative to the film plane can be established.

DESCRIPTION OF THE PREFERRED EMBODIMENT

Figures 1, 2:
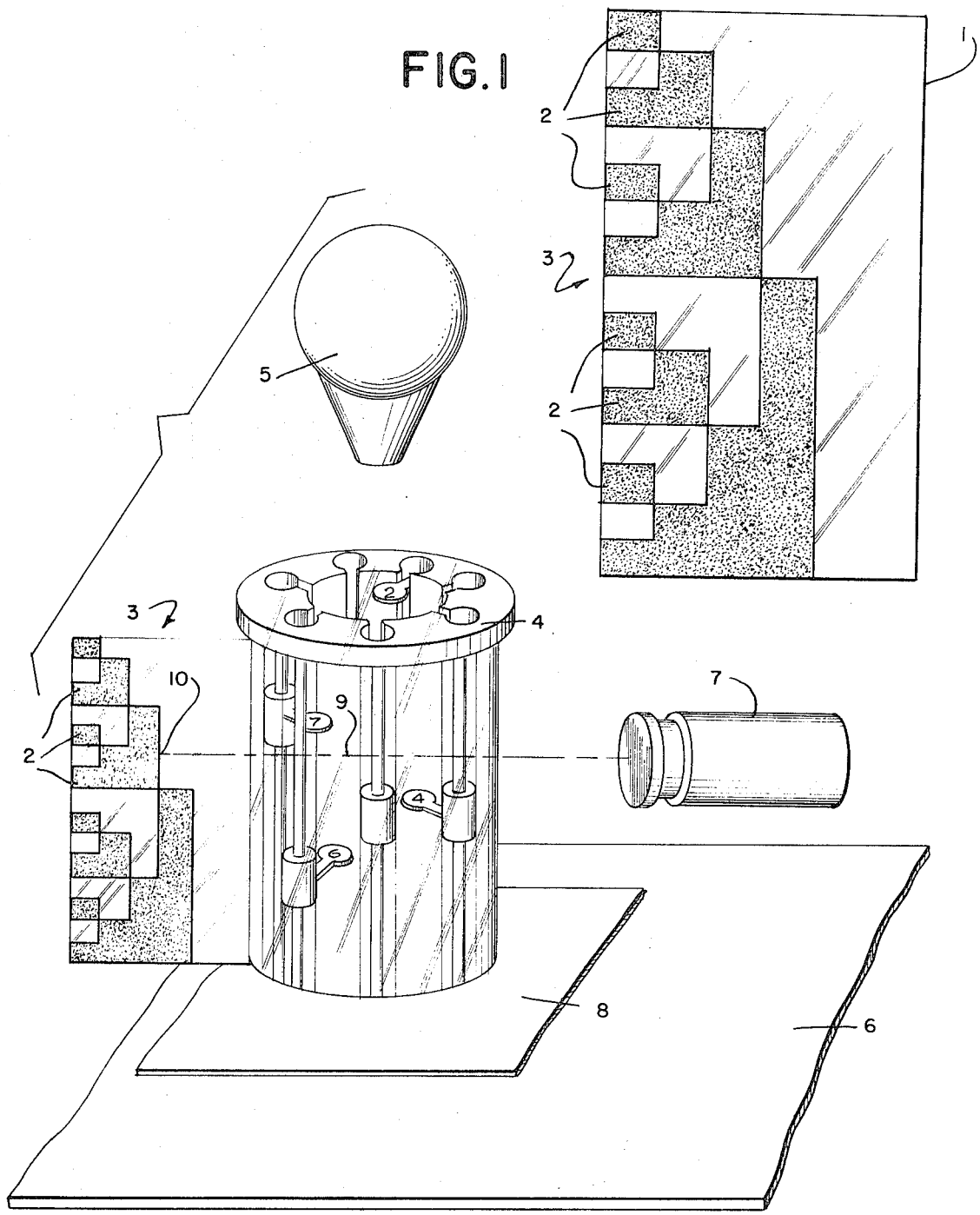
FIG. 1 is a top view of the test object of this invention.
FIG. 2 is an isometric view of the test object of this invention in use.

Body section radiography has progressed to a point where a plane of focus can be sharply relieved on the radiograph. In co-pending application, "A Test Object and Cassette for Tomography," Ser. No. 686,889, filed 30 Nov. 1967, now U.S. Pat. No. 3,509,337, issued Apr. 28, 1970, a test object for determining the location of the plane of focus was described. However, the test object therein described cannot easily be used to determine the depth of focus at the focus plane. The invention described herein will simultaneously measure the depth of focus or selectivity as it is known in the art of each section of a multisection tomography exposure in one exposure, and it can be used in conjunction with the previously described test object to determine the location of each focus plane. Depth of focus is distinguished from focus plane location in that depth of focus refers to the thickness of the focus plane which is being imaged upon a film. Referring to FIG. 1, the test object comprises a planar surface 1 of X-ray transparent material on which are mounted X-ray opaque elements 2 arranged in a coded sequence. Said elements are arranged in a continuous, descending, vertical relationship such that every horizontal plane passing through said planar surface 1 of X-ray transparent material will pass through an X-ray opaque element or intersection thereof as shown in FIG. 1. In this embodiment a binary sequence of numbers from one to 31 in descending vertical relationship is used, although any system of coding for the arrangement of the opaque elements which permits their identification from an X-ray exposure may be employed.

Referring to FIG. 2, the test object 3 is shown in use with the test object 4 described in co-pending application, Ser. No. 686,889, filed 30 Nov. 1967 now U.S. Pat. No. 3,509,337, issued Apr. 28, 1970, an X-ray source 5, a film plane 6, and a light source positioning device 7. In use, the test objects 3 and 4 are positioned on the table 8 between the X-ray source 5 and the film plane 6. The test object 4 is calibrated as indicated in U.S. Pat. No. 3,509,337 to determine the location of the various focus planes. The test object 3 is inclined at a convenient angle, e.g., 45°, with respect to the X-ray beam axis by means of a support stand or by constructing the test object 3 so that it is self-supporting. Thus, when a particular tomographic machine is calibrated utilizing the test object as indicated in U.S. Pat. No. 3,509,337, it is possible to determine not only the location of each focus plane, but also the depth of focus, or thickness of each plane by observing what portion of the coded elements are clearly imaged upon the corresponding film in the cassette. By use of the light source positioning device 7, a selected element 10 in the test object 3 is aligned with a selected number 9 in the test object 4. This establishes a reference between the relative positions of the test objects 3 and 4 so that the depth of focus for each section of the tomographic device can be determined. An X-ray exposure is taken, and the resulting image can be used to show the depth of focus of the X-ray device in the region of each section of the multisection exposure. The region of focus will show up on the film as a sharply defined image of a portion of the coded arrangement of the opaque elements 2 on the test object 3. The limits of the region of focus are located by the beginning of a shadow or indistinctness of the image of the coded elements. In a single exposure the depth of focus of all sections of a multisection tomography X-ray device can be determined simultaneously by measurement of the region of the coded opaque elements in focus on each film sheet exposed in the various film planes of the multisection tomographic device.

Since the preferred embodiment of this invention has the digital scale set at an angle of 45° to the X-ray beam, by making each elemental binary width equal to $\sqrt{2}$ millimeters, the vertical height or depth of focus of a particular focus plane can be read directly in millimeters. That is to say, the length of the coded opaque elements clearly imaged upon the various film planes equals the depth of focus. Once the location and depth of focus of the various focus planes are determined, the test objects and the digital scale are withdrawn from the path of the X-ray beam and replaced by an object to be examined. The object to be examined is then raised or lowered into alignment with the test object lead numbers so that the particular areas (planes) sought to be examined will be positioned properly with respect to the X-ray source.

We claim:

1. A digital scale for tomography comprising a planar surface of X-ray transparent material inclined at an angle with respect to an X-ray beam axis and a plurality of X-ray opaque elements mounted upon said planar surface and arranged in a continuous, descending relationship such that every horizontal plane passing through said planar surface will pass through an opaque element or intersection thereof, wherein the relationship of the angle of inclination of said transparent material and the projection of the image of said opaque elements upon a horizontal surface determines the depth of focus of an X-ray focus plane.

2. The device of claim 1 wherein said X-ray opaque elements form a rectangular outline and are arranged in a binary code.

3. The device of claim 1 used in combination with a test object for locating the focus plane of a tomographic X-ray machine.

4. The device of claim 3 in which indicating means are provided to indicate alignment of said test objects.

5. A method for predetermining the depth of focus at the focus plane for radiographs produced by a tomographic process comprising:
   a. locating a sheet of X-ray transparent material including X-ray opaque elements thereon arranged in a coded sequence in the path between an X-ray source and a film plane, wherein said sheet of X-ray transparent material is inclined at an angle with respect to said film plane;
   b. exposing said sheet containing said X-ray opaque elements to a source of X-ray energy, and projecting such exposure onto a film sensitive to X-ray radiation;
   c. removing said source of X-ray energy and processing said film; and
   d. inspecting said film to determine the continuous coded sequence which is sharply defined thereon identifying the depth of focus at the focus plane.

6. The method recited in claim 5 further comprising:
   a. locating a test object for determining a focus plane adjacent said inclined sheet of X-ray transparent material including X-ray opaque elements in the path between an X-ray source and a film plane;
   b. selecting a focus plane on said test object;
   c. aligning said preselected focus plane on said test object with an X-ray opaque element on said inclined sheet of X-ray transparent material;
   d. exposing said test object and said inclined sheet simultaneously to a source of X-ray radiation and projecting said exposure onto a film sensitive to X-ray radiation;
   e. removing said X-ray source and processing said film; and
   f. inspecting said processed film to identify said preselected focus plane and said depth of focus of said focus plane defined by variations in distinctness of the image of said X-ray opaque elements.

* * * * *